(12) United States Patent
Matsuda

(10) Patent No.: US 6,944,353 B2
(45) Date of Patent: Sep. 13, 2005

(54) IMAGE PROCESSING SYSTEM

(75) Inventor: Yoichi Matsuda, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 676 days.

(21) Appl. No.: 09/968,757

(22) Filed: Oct. 3, 2001

(65) Prior Publication Data

US 2003/0016867 A1 Jan. 23, 2003

(30) Foreign Application Priority Data

Feb. 20, 2001 (JP) ........................................ 2001-042700

(51) Int. Cl.$^7$ .............................................. G06K 9/40
(52) U.S. Cl. ........................ 382/274; 382/275; 358/461
(58) Field of Search ................................ 382/274, 275; 358/461

(56) References Cited

U.S. PATENT DOCUMENTS

| | | | | | |
|---|---|---|---|---|---|
| 5,282,061 A | * | 1/1994 | Farrell | ......................... | 358/464 |
| 5,699,454 A | * | 12/1997 | Nakai et al. | ................. | 382/172 |
| 5,850,298 A | * | 12/1998 | Narahara et al. | ........... | 358/518 |
| 6,028,958 A | * | 2/2000 | Kanamori | ................... | 382/171 |
| 6,198,845 B1 | * | 3/2001 | Tse et al. | ..................... | 382/169 |
| 6,222,642 B1 | * | 4/2001 | Farrell et al. | ................. | 358/1.9 |
| 6,674,899 B2 | * | 1/2004 | Nagarajan et al. | .......... | 382/168 |
| 2001/0055122 A1 | * | 12/2001 | Nagarajan et al. | ........... | 358/1.9 |

FOREIGN PATENT DOCUMENTS

| | | |
|---|---|---|
| JP | A4-37258 | 2/1992 |
| JP | A4-37259 | 2/1992 |

* cited by examiner

Primary Examiner—Jon Chang
(74) Attorney, Agent, or Firm—Oliff & Berridge, PLC

(57) ABSTRACT

An image processing system of the present invention comprises an image inputting portion 1 for inputting image data, a ground-level detecting portion 3 for detecting a ground level of the input image data, a pasted-manuscript deciding portion 4 for deciding whether or not the image data is a pasted manuscript, based on a user's indication or the ground level detected by the ground-level detecting portion 3, a ground-level adjusting portion 5 for adjusting the ground level in response to a distribution of the ground level detected by the ground-level detecting portion 3 if the image data is decided as the pasted manuscript, and a ground removal processing portion 6 for removing a ground of the image data at the ground level adjusted by the ground-level adjusting portion 5.

10 Claims, 14 Drawing Sheets

LOW CONTRAST

THINNED

AFTER LOW CONTRAST ADJUSTMENT

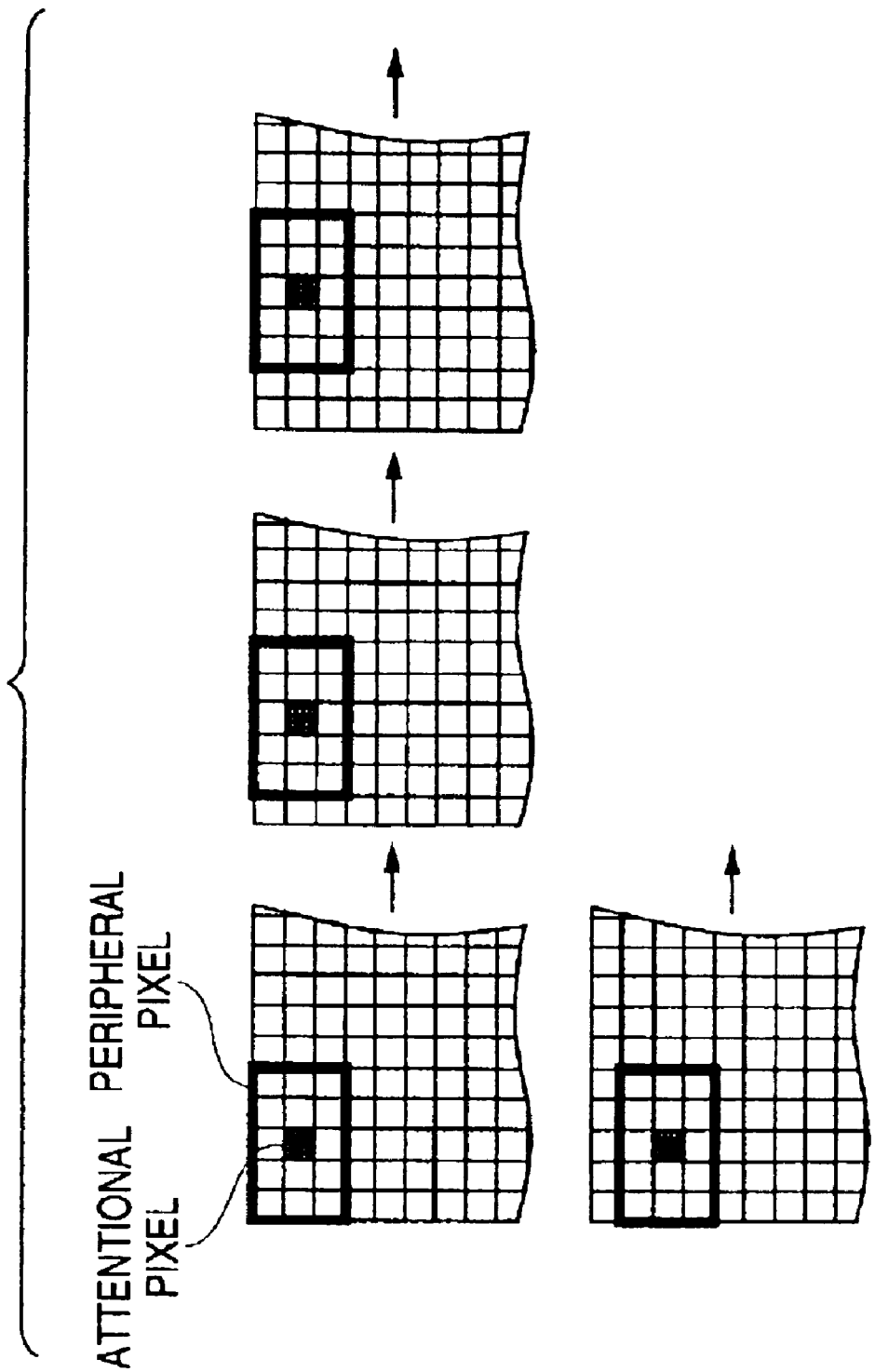

FIG. 7A

| 25 | 23 | 26 | 23 | 20 | 100 | 101 | 100 | 102 |
|---|---|---|---|---|---|---|---|---|
| 25 | 22 | 24 | 22 | 22 | 100 | 102 | 102 | 100 |
| 200 | 201 | 201 | 200 | 25 | 101 | 101 | 100 | 100 |
| 202 | 205 | 205 | 200 | 24 | 102 | 101 | 105 | 102 |
| 210 | 207 | 203 | 201 | 23 | 103 | 101 | 102 | 104 |
| 211 | 207 | 204 | 202 | 24 | 105 | 102 | 105 | 105 |

| 25 | 23 | 26 | 30 | 60 | 75 | 101 | 100 | 102 |
|---|---|---|---|---|---|---|---|---|
| 25 | 22 | 24 | 43 | 62 | 100 | 102 | 102 | 100 |
| 200 | 201 | 69 | 77 | 85 | 93 | 101 | 100 | 100 |
| 202 | 205 | 113 | 111 | 108 | 105 | 101 | 105 | 102 |
| 210 | 207 | 203 | 144 | 130 | 103 | 101 | 102 | 104 |
| 211 | 207 | 204 | 202 | 24 | 105 | 102 | 105 | 105 |

| 25 | 23 | 26 | 23 | 20 | 20 | 23 | 25 | 24 |
|----|----|----|----|----|----|----|----|----|
| 25 | 22 | 22 | 22 | 22 | 21 | 22 | 23 | 21 |
| 23 | 21 | 21 | 23 | 21 | 23 | 24 | 23 | 21 |
| 202 | 205 | 205 | 200 | 152 | 151 | 155 | 200 | 201 |
| 210 | 207 | 203 | 201 | 151 | 152 | 201 | 200 | 199 |
| 211 | 207 | 204 | 202 | 149 | 152 | 201 | 205 | 200 |

| 25 | 23 | 26 | 23 | 20 | 20 | 23 | 25 | 24 |
|----|----|----|----|----|----|----|----|----|
| 25 | 22 | 22 | 22 | 22 | 21 | 22 | 23 | 21 |
| 23 | 21 | 21 | 23 | 21 | 23 | 24 | 23 | 21 |
| 202 | 205 | 205 | 189 | 173 | 151 | 155 | 200 | 201 |
| 210 | 207 | 203 | 186 | 169 | 152 | 160 | 200 | 199 |
| 211 | 207 | 204 | 202 | 149 | 152 | 159 | 205 | 200 |

· · · · · · · · ·

⋮

IMAGE PROCESSING SYSTEM

BACKGROUND

The present invention relates to an image processing system for detecting a ground level from an image data density to remove thereof.

In the image recording apparatus such as the copying machine, the facsimile, etc., not only the manuscript using the ordinary white paper but also the manuscript using various papers such as the recycled paper, the colored paper, etc. is used as the object of reading. In this manner, since the ground density is high in the manuscript using the paper other than the ordinary paper, the ground of the manuscript appears in the output image to result in the dirty image if the image data that are read by the manuscript reading portion such as the CCD sensor, or the like are output as they are.

Therefore, in the prior art, the process of executing the developing bias adjustment by reading a particular area near the center of the manuscript to detect the average quantity of light is applied to such manuscript the ground of which has a certain density.

Also, in the Unexamined Japanese Patent Application Publication No. Hei 4-37259, the technology that the threshold value for the ground removal can be set every area of the image data and also the threshold value can be switched by detecting respective ground density areas from the manuscript in which a plurality of ground densities are mixedly present is disclosed.

In addition, in the Unexamined Japanese Patent Application Publication No.Hei 4-37258, the technology that the optimum threshold value for the ground removal can be decided by detecting precisely respective ground density areas from the pasted manuscript in which a plurality of ground densities are mixedly present is disclosed.

However, the abrupt change in the ground level is caused at the border portion of the image in the pasted manuscript, otherwise the manuscript having the unevenness in the ground, except the pasted manuscript, such that the change in the ground level is continued successively appears similarly as the change in the ground level. Therefore, if the ground level switching like the technology disclosed in the Unexamined Japanese Patent Application Publication No. Hei 4-37259 is applied to the manuscript having the ground unevenness, there is caused the problem that the unevenness still remains in the area, at which the ground level is switched, of the image after the ground is removed.

Also, since both the pasted manuscript and the manuscript having the ground unevenness have the change in the ground level, it is difficult to discriminate them. If the manuscript having the ground unevenness is contained in the pasted manuscript, it is difficult to execute the process such that the switching process is not applied to the image having the unevenness, or the like.

In addition, if the image such as the photographic image, the ground level of which is not constant, is contained in the pasted manuscript, it is difficult to discriminate such image from the manuscript having the ground unevenness. Thus, it is impossible not to apply the ground removing process to the photographic image.

Further, in the case of the manuscript having the ground unevenness, sometimes difference between the calculated ground level and the ground level of the neighboring pixels or areas occurs and then remains as the unevenness in the image from which the ground is removed.

In addition, in some cases the images having various ground levels are contained in the pasted manuscript. Thus, if the ground level becomes higher, difference between the necessary density of letters, lines, etc. and the ground density becomes close to each other to result in the low contrast. Therefore, there is caused the problem that, if the image has the higher ground level, the necessary densities disappear by the ground removing process, or the densities become light.

SUMMARY

The present invention has been made to overcome such subjects. More particularly, an image processing system of the present invention comprises an image inputting portion for inputting image data, a ground-level detecting portion for detecting a ground level of the image data input by the image inputting portion, a pasted-manuscript deciding portion for deciding whether or not the image data is a pasted manuscript, based on a user's indication or the ground level detected by the ground-level detecting portion, a ground-level adjusting portion for adjusting the ground level in response to a distribution of the ground level detected by the ground-level detecting portion if the image data is decided as the pasted manuscript by the pasted-manuscript deciding portion, and a ground removing portion for removing a ground of the image data at the ground level adjusted by the ground-level adjusting portion.

In the present invention, since it is detected by the pasted-manuscript deciding portion whether or not the image data is the pasted manuscript and also the ground level is adjusted properly by the ground-level adjusting portion if the image data is the pasted manuscript, the more proper ground removal can be applied to the manuscript. Also, since the ground level is adjusted in response to the distribution of the ground level, the proper ground removal can be applied to the manuscript that has unevenness in the ground.

BRIEF DESCRIPTION OF THE DRAWINGS

FIG. 4 is views showing a window process.

FIGS. 7A–7B are views showing examples of the calculation of the ground level by the window process.

FIGS. 10A–10C are views showing adjustment of the ground level by a block process.

FIGS. 13A–13B are views showing the process when the image having unevenness of the ground level is contained.

DETAILED DESCRIPTION OF EMBODIMENTS

[Embodiment of the Invention]

Figure 1:
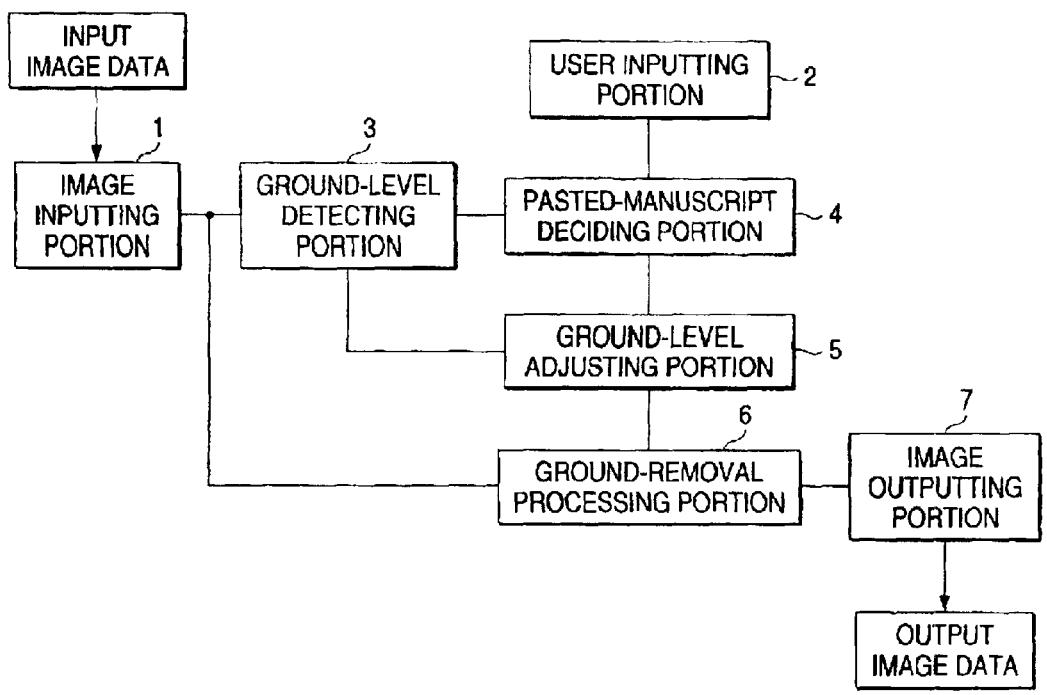
FIG. 1 is a block diagram showing an image processing system of the present embodiment.

An embodiment of the present invention will be explained with reference to the accompanying drawings hereinafter. FIG. 1 is a block diagram showing a configuration of an image processing system of the present embodiment. That is, the image processing system of the present embodiment comprises an image inputting portion 1, a user inputting portion 2, a ground-level detecting portion 3, a pasted-manuscript deciding portion 4, a ground-level adjusting portion 5, a ground-removal processing portion 6, and an image outputting portion 7.

The image inputting portion I has a function for receiving the image data from the scanner, the host, etc., and also has a function for absorbing the timings that are received in real time by the ground-level detecting portion 3 and the ground-removal processing portion 6 provided at the later stages, e.g., has a memory in the inside.

Figure 2:
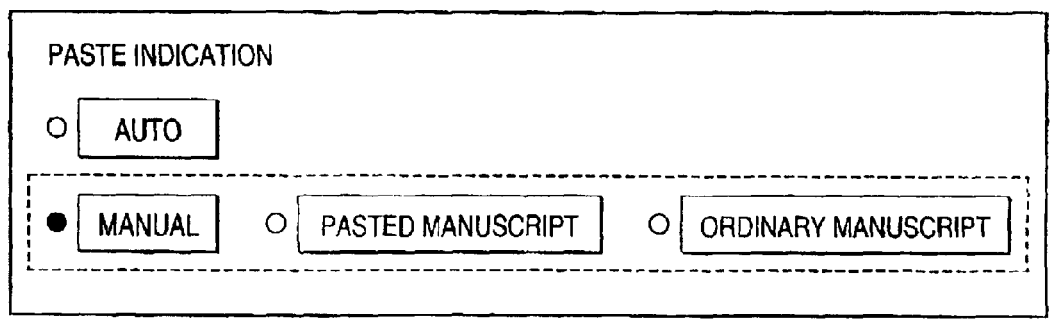
FIG. 2 is a view showing a user interface.

The user inputting portion 2 has a portion for indicating the system to automatically or manually decide whether or not the input image data is a pasted manuscript, according to the user's input by using a user interface as shown in FIG. 2, and also has a portion for indicating whether or not the image data is the pasted manuscript when the manual setting is selected.

Figure 3A:
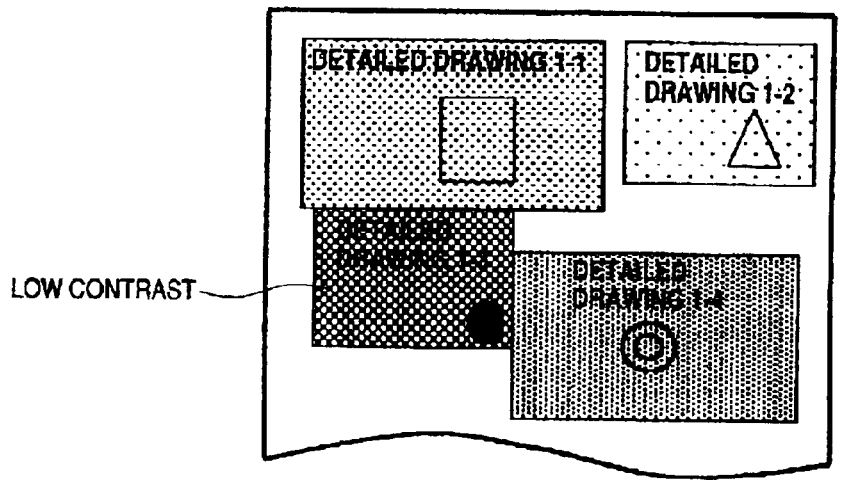
FIGS. 3A–3C are views showing pasted images.

Here, the pasted manuscript signifies the manuscript on which images are pasted together, as shown in FIG. 3A. The ordinary manuscript signifies the manuscript that consists of a one-type single image containing the image having the unevenness (variation) in the ground level. Also, assume that the density values shown in the drawings and the examples are set to the value of 0 to 255 for convenience, and that the density is lighter as the value becomes closer to 0 and the density is deeper as the value becomes closer to 255.

Figure 5:
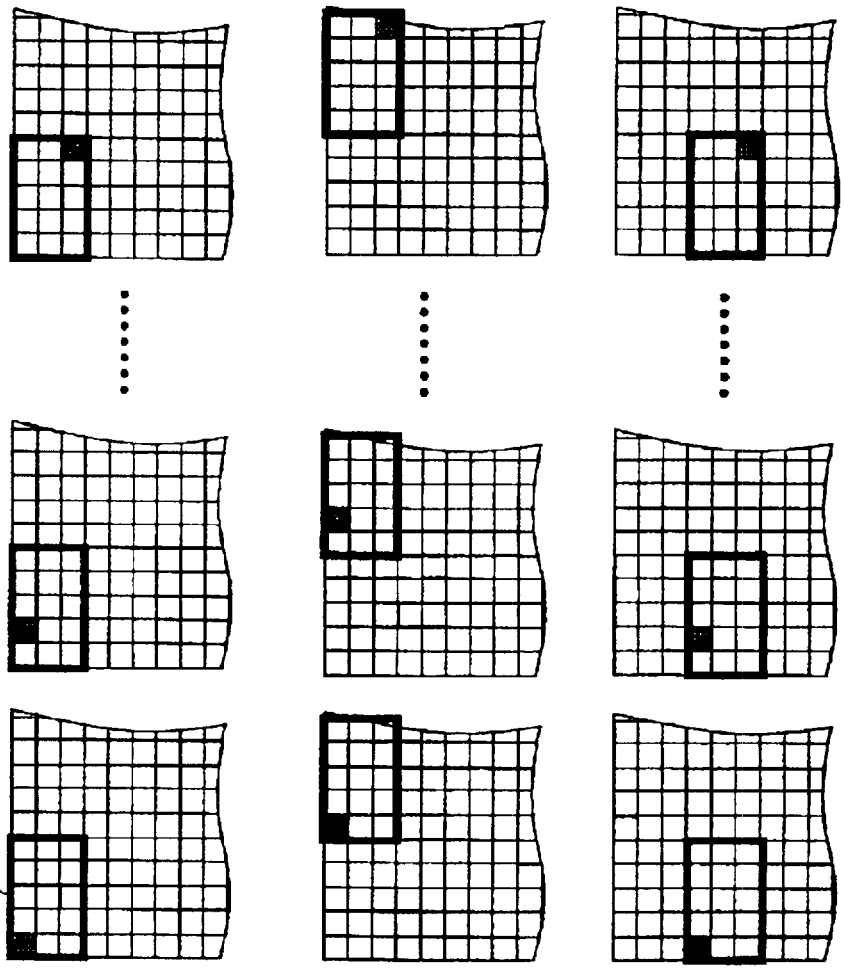
FIG. 5 is views showing a block process.

The ground-level detecting portion 3 receives the image data from the image inputting portion I and calculates the ground level. Assume that the calculation of the ground level is executed by a window process in which the ground level is calculated by using peripheral pixels around the attentional pixel, as shown in FIG. 4, or a block process in which the process is executed in a fixed area, as shown in FIG. 5, using the indices such as the intermediate value, the average value, the histogram, etc. Also, since the ground-level adjusting portion 5 described later does not depend upon the ground-level detecting portion 3, there may be applied the method of deciding the ground level by using one line having any width, or the method of setting the ground level by overlapping the areas as set forth in the Unexamined Japanese Patent Application Publication No. Hei 4-37258, for example.

Figure 6A:
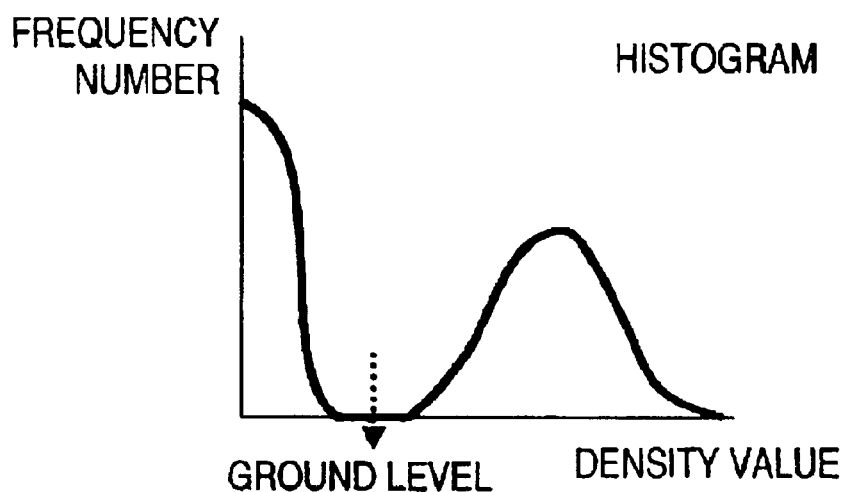
FIGS. 6A–6B are views showing calculation of a ground level.
Figure 6B:
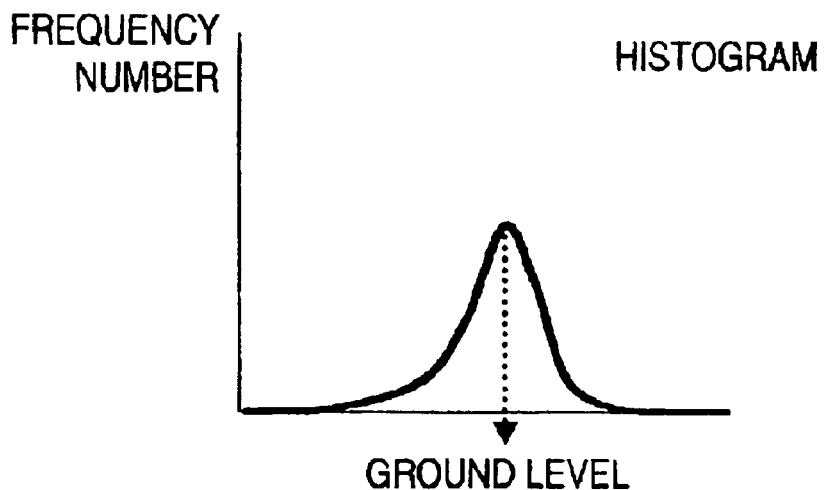

Similarly, the ground-level adjusting portion 5 does not depend upon the indices used to decide the ground level. For example, there are the method of calculating an average value and an intermediate value of the pixel in any range in the case of the average value and the intermediate value or separating the ground and other necessary information in the case of calculation in the histogram (see FIG. 6A), the method of detecting simply the density value which has the maximum frequency as the ground level (see FIG. 6B), etc. The ground level calculated by any method is adjusted by adding/subtracting a constant value.

The pasted-manuscript deciding portion 4 has a function of judging/deciding whether or not the image data should be handled as the pasted manuscript based on the method that is indicated by the user via the user inputting portion 2.

More particularly, if the "manual" is selected by the user inputting portion 2, the pasted-manuscript deciding portion 4 decides the selected one of the "pasted manuscript" and the "ordinary manuscript" in the user inputting portion 2 as the type of the manuscript. Also, if the "auto" is selected by the user inputting portion 2, the pasted-manuscript deciding portion 4 automatically judges/decides the pasted manuscript or the ordinary manuscript based on calculated results obtained by the ground-level detecting portion 3.

If the type of the manuscript is decided automatically, the area having the much change in the ground level is searched according to plural conditions such as neighboring pixels around the attentional pixel, the window process or the block process, etc., then such area having the much change is compared with the overall manuscript, and then the image data is decided as the pasted manuscript if the rate is large. In contrast, if the rate is small, the image data is decided as the ordinary manuscript.

As the portion for deciding the change, following examples are thought of.

a. A difference, a rate of change, and a variance value between compared objects are large.

b. The between compared objects have connection with any reference values.

The case where the ground level is detected by using the average value according to the window process to decide whether or not the manuscript is the pasted manuscript will be explained as an example. In FIG. 7A, the average values calculated by the window process as shown in FIG. 4 are shown in respective pixels. In this case, in the range of the window whose average value has been calculated or the window whose size is newly defined, the difference between the maximum value and the minimum value, the magnitude of the variance value, the rate of change of the neighboring pixels, etc. are calculated, then the number of the windows having the large change and the number of the windows having the small change are compared mutually, and then the manuscript is the pasted manuscript if a rate of the number of the windows having the large change is in excess of a predetermined reference. Here definition of the range may be achieved by the block process.

The ground-level adjusting portion 5 has a function of adjusting the ground level in response to the type of the manuscript that is decided by the pasted-manuscript deciding portion 4.

Figure 8A:
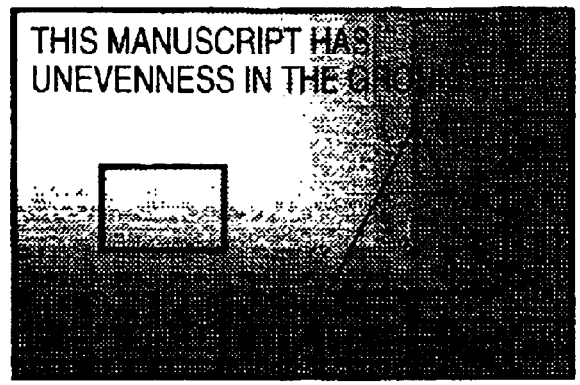
FIGS. 8A–8C are views showing manuscripts having unevenness of the ground level.
Figure 8B:
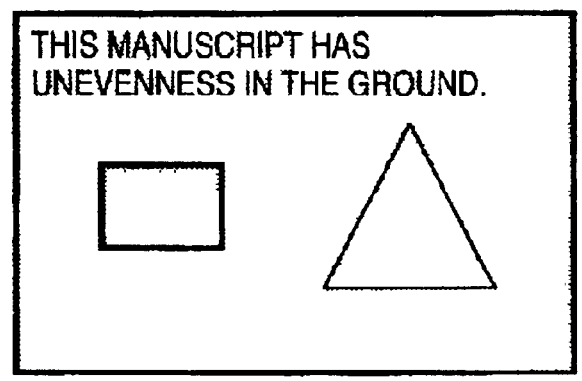

Then, the process taken in the ground-level adjusting portion 5 when the pasted-manuscript deciding portion 4 decides the manuscript as the ordinary manuscript will be explained hereunder. That is, it is decided that the ordinary manuscript contains the area in which the change in the ground level is large if it contains the manuscript in which the change in the ground level is not so large but the ground level is uneven (see FIG. 8A) or the image such as a photographic image, etc. In such case, if the ground removing process is carried out by utilizing the ground level detected by the ground-level detecting portion 3 as it is, the pixels having the large change or the profile of the window or the block as the arbitrary area remains in the processed image to result in the image, as shown in FIG. 8B, for example.

Figure 8C:
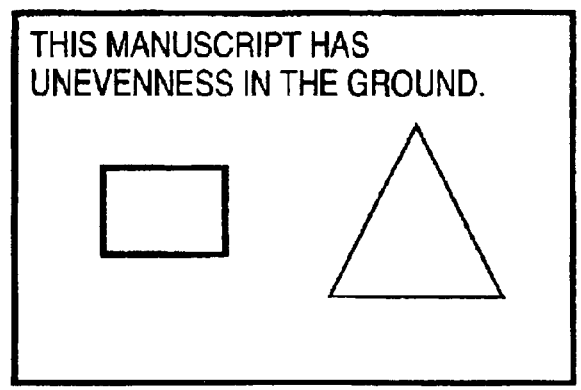

Therefore, in the case of the ordinary manuscript, in order to reduce the unevenness in the ground level, the adjustment of the ground level is executed such that the detected ground level can be changed gently. Accordingly, the image which has been subjected to the ground process, as shown in FIG. 8C, can be obtained. Particular groundlevel adjusting methods will be explained hereunder.

(1) Ground-Level Adjustment by the Window Process

If the window having the much change in the ground level is detected, the ground-level adjusting portion 5 adjusts the ground levels of respective pixels in the window based on the ground levels at four corners of the window according to a following equation (1).

Assume that the ground levels at the upper left-hand corner, the upper righthand corner, the lower left-hand corner and the lower right-hand corner are set to lu, ru, ld, and rd respectively, a distance from the upper left-hand pixel in the rightward direction is w, a distance from the upper left-hand pixel in the downward direction is h, a size of the window in the lateral direction is sa, and a size of the window in the vertical direction is la. Then, an adjusted ground level Th can be calculated by $$\text{Adjusted ground level } Th = (ru-lu) \times w/sa + (rd+lu-ru-ld) \times w \times h/(sa \times la) + (ld-lu) \times h/la + lu \quad (1)$$

FIG. 7B shows the adjusted result obtained by applying the above equation (1) only to the area surrounded by the frame.

In addition, the windows having the large change can be adjusted sequentially by applying the same equation (1). Also, the equation (1) may be applied to not only the windows having the large change but also the overall area.

Figure 9A:
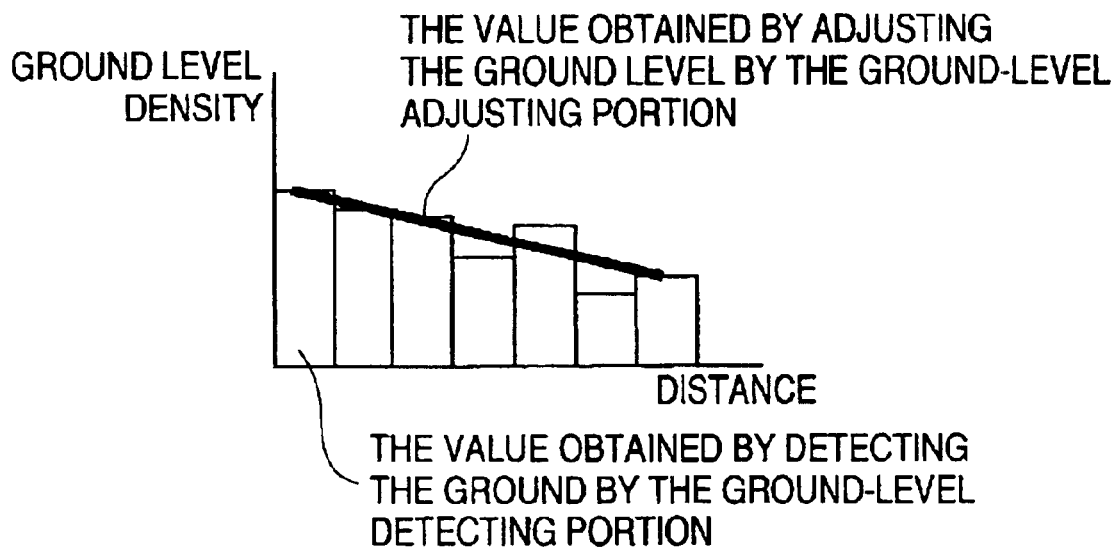
FIGS. 9A–9B are views showing examples for adjusting smoothly the ground level.
Figure 9B:
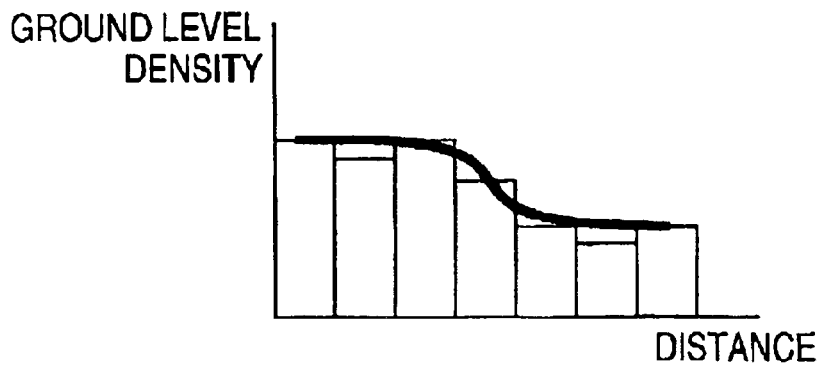

FIG. 9 shows the ground level densities that are detected on the basis of the upper left-hand pixel along any distance of the lateral, vertical and diagonal directions and then adjusted respectively. By using the above equation (1), the ground level can be adjusted linearly such that it can be changed gradually and continuously, as shown in FIG. 9A. Also, by using other formula, the ground level can be adjusted as a curved line, etc., as shown in FIG. 9B.

(2) Ground-Level Adjustment by the Block Process

Figures 10A, 10B, 10C:
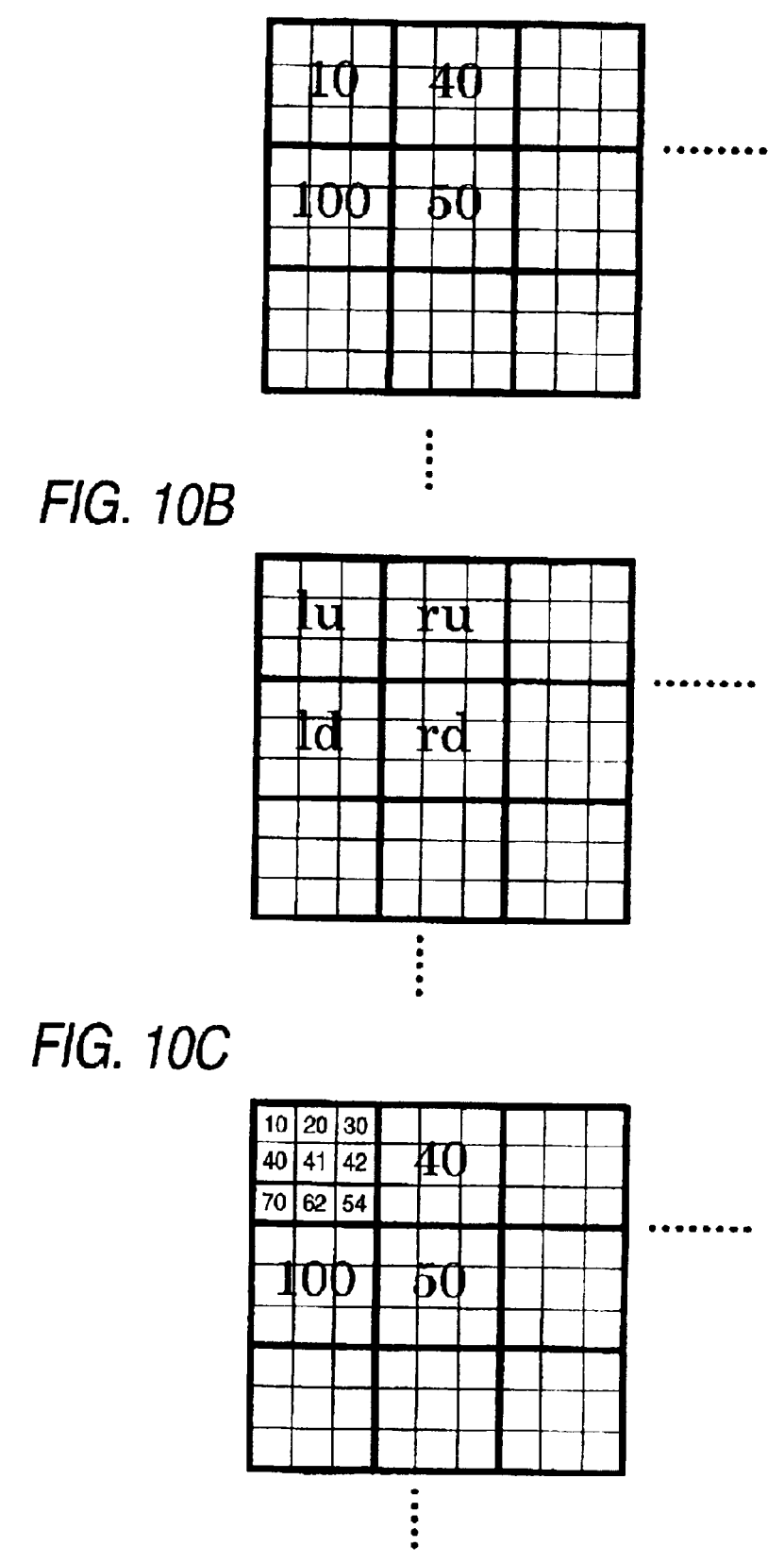

FIG. 10A shows the ground level values of respective blocks when the ground level is detected by the block process. The ground-level adjusting portion 5 detects the neighboring block having the large change, e.g., the upper left-hand block, and represents respective blocks by symbols shown in FIG. 10B. Then, under the assumption that the distance from the upper left-hand pixel in the rightward direction is w, the distance from the upper left-hand pixel in the downward direction is h, the size of the window in the lateral direction is sa, and the size of the window in the vertical direction is la, the ground-level adjusting portion 5 calculates the adjusted threshold values of respective pixels according to the above equation (1).

FIG. 10C shows a result of adjusting the ground level of each pixel.

Where the equation (1) is an example of the linear formula, as shown in FIG. 9A. The ground level can be adjusted by the calculation using the curved line, etc., as shown in FIG. 9B. Also, the equation (1) may be applied to not only the blocks having the large change but also the overall area.

In contrast, if it is decided by the pasted-manuscript deciding portion 4 that the image data is the pasted manuscript, the ground-level adjusting portion 5 executes the ground level adjustment described in the following.

That is, the pixels with the large change and arbitrary areas are present in the pasted manuscript shown in FIG. 3A. If the same adjustment as the ordinary manuscript to change gently the ground level is applied to such pasted manuscript, the edge still remains in the image in the area in which the ground level is adjusted lower than the ground level that is detected actually at the border surface of the pasted image having the much change, whereas the edge image disappears in the area in which the ground level is adjusted higher than the actually detected ground level, as shown in FIG. 11A.

Figure 11A:
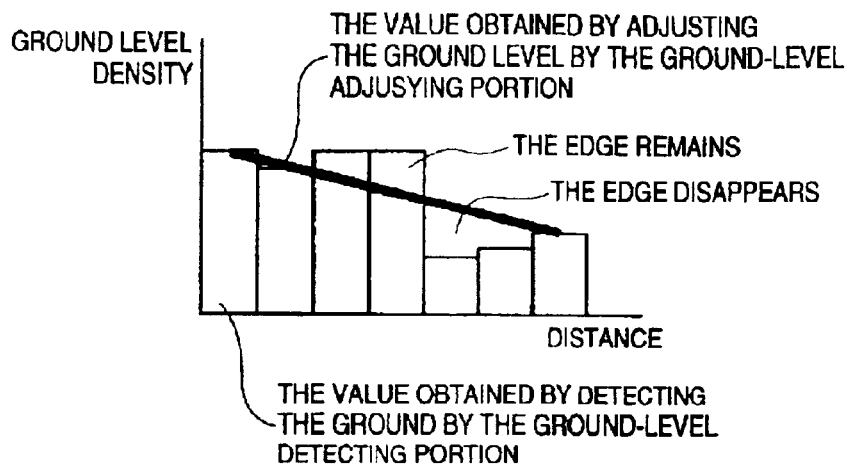
FIGS. 11A–11C are views showing adjustment of the ground level by a block process when the change is significant.
Figure 11B:
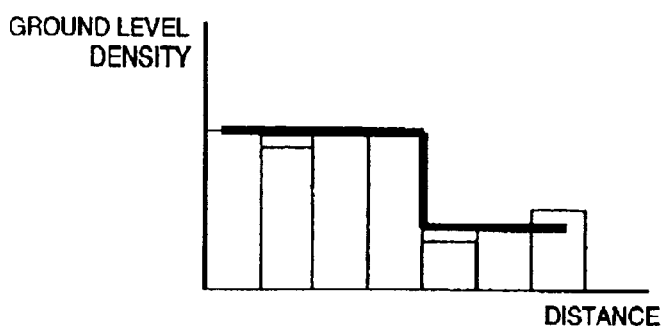
Figure 11C:
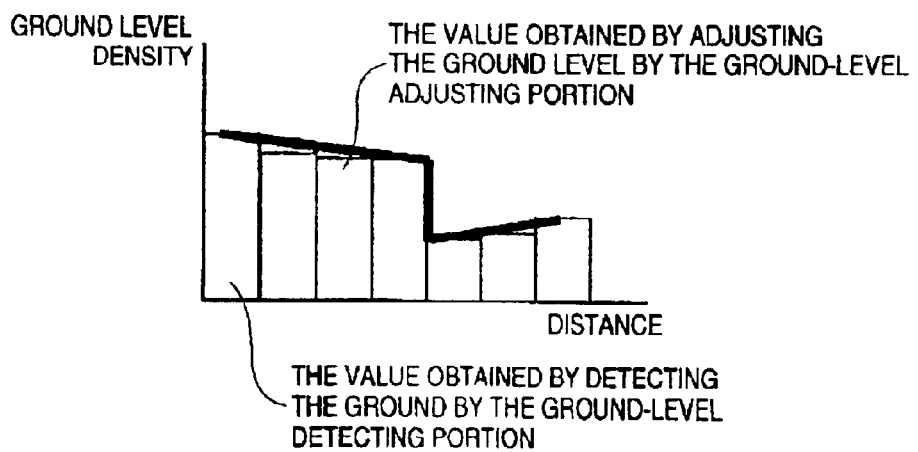

Therefore, in the case of the pasted manuscript, as shown in FIGS. 11A and 11B, the ground level is adjusted such that it can be rapidly changed in response to the change in the detected ground level. Accordingly, for example, the ground levels of respective images shown in FIG. 3A can be adjusted and thus the images shown in FIGS. 3B and 3C can be obtained.

Then, the case where the pasted-manuscript deciding portion 4 decides the manuscript as the pasted manuscript and the pasted manuscript has the unevenness in the ground level density will be explained hereunder.

Figure 12A:
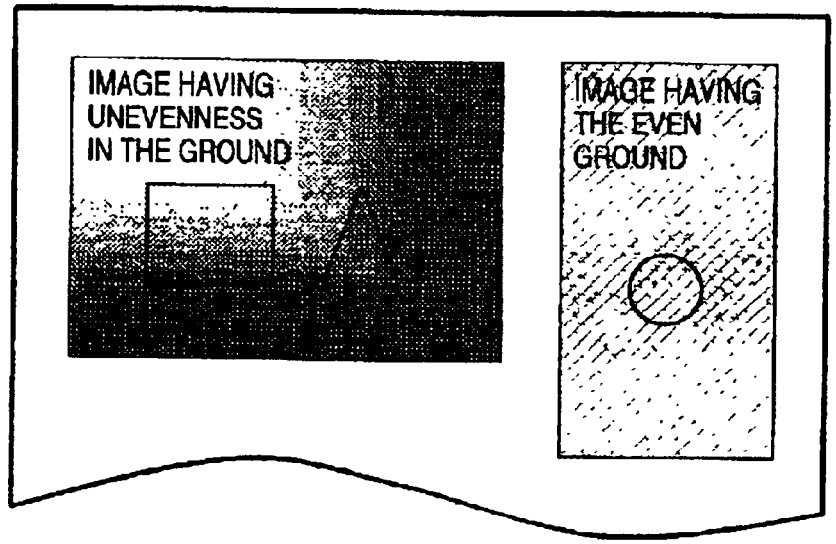
FIGS. 12A–12B are views showing a pasted manuscript having unevenness of the ground level.
Figure 12B:
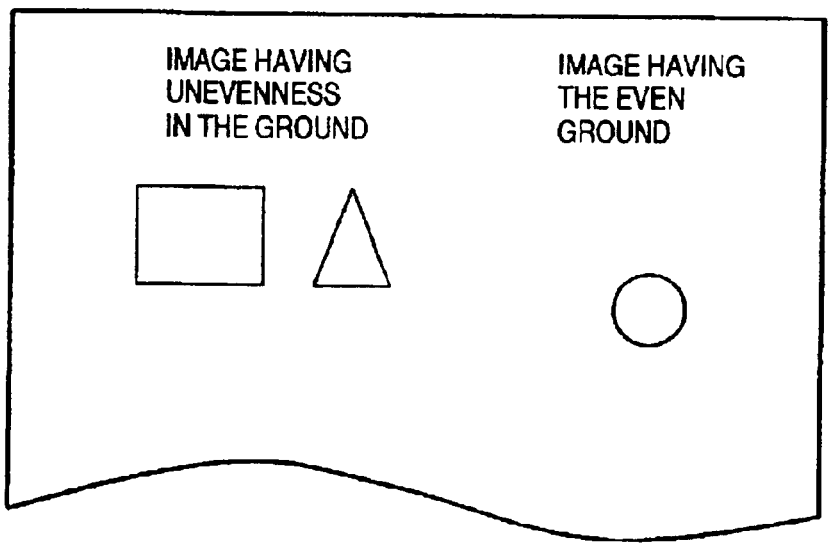

In the case of the pasted manuscript, as described above, the ground-level adjusting portion 5 has a function of adjusting the ground level such that the ground level can be abruptly changed in response to the magnitude of the change in the detected ground level. In some cases, the image having the nonuniform ground-level density and the unevenness, as shown in FIG. 12A, is contained in a part or all of the image in the pasted manuscript. However, since the ground level is changed in the similar way in both the image having the uneven ground and the surrounding edge portion of the pasted manuscript, it is difficult to discriminate such image from the edge portion.

Therefore, according to a degree of the change in the ground level, the pasted portion or the portion having the even or uneven ground level density are decided by methods described in the following.

a. If the difference or the rate of change exceeds the reference $\beta$ in the attentional pixel and the neighboring pixels, the window process, and the block process, the image is decided as the pasted image. In contrast, if the difference or the rate of change is below the reference $\beta$, the image is decided as the uneven image portion.

the difference or the rate of change $\geq \beta$: the pasted image portion the difference or the rate of change $< \beta$: the even or uneven image portion b. A reference density $\gamma$ is defined, and then the pasted image portion and the uneven image portion are decided according to the magnitude of $\gamma$ in the neighboring pixels, the window process, and the block process. If the $\gamma$ is defined as the white reference value in which no image is assumed, the border portion between the blank and the image can be detected.

(An Example of the Neighboring Window)

|the former window−the later window |>$\gamma$: the pasted image portion

Remaining conditions: the even or uneven image portion

According to any one of above decision standards a and b, the pasted image portion and the even/uneven image portion are discriminated mutually and then the ground level is adjusted. For example, FIG. 13A contains the pasted image and the image having the unevenness in the ground in the same frame, and the ground levels are adjusted as shown in FIG. 13B after the process is applied.

The ground-removal processing portion 6 looks up the ground level in unit of each pixel or arbitrary area adjusted by the ground-level adjusting portion 5, then applies the ground removing process to the image data being input from the image inputting portion 1, and sends out the processed data to the image outputting portion 7. In this case, the ground-removal processing portion 6

> Input image≧Th (input pixel): outputs the image as it is
>
> Input image<Th (input pixel): remove the image as the ground if the ground level of a certain pixel is assumed as Th (input pixel), for example.

Where the ground-removal processing portion 6 can calculates the output density based on the relationship between the input image and Th (input pixel).

According to such process, the border of the pasted image and the image having the unevenness in the ground contained in the pasted manuscript can be discriminated simultaneously, and thus the adjustment of the ground level suitable for respective images can be carried out automatically. Therefore, the proper ground level adjustment can be applied to all image portions in the pasted manuscript without the user's process indication to respective images, and at the same time the ground removal can be carried out.

Then, in case the image data is decided as the pasted manuscript by the pasted-manuscript deciding portion 4, there will be explained hereunder a method of deciding by the ground-level adjusting portion 5 whether or not the image data is the ground removing object portion.

Figure 14A:
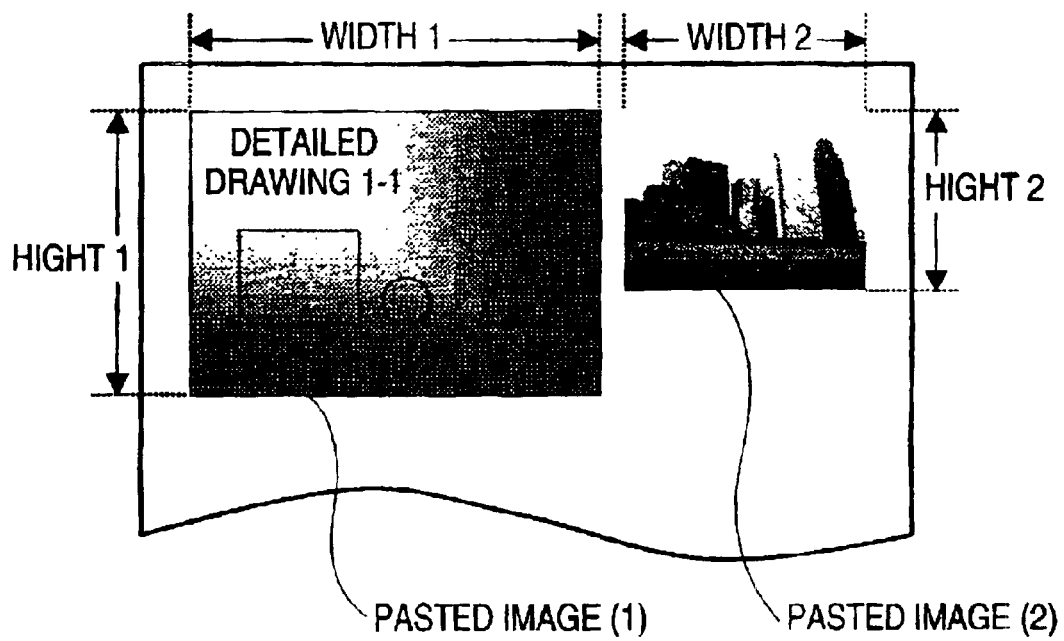
FIGS. 14A–14B are views showing the pasted manuscript containing a photographic image.

The manuscript shown in FIG. 14A is the manuscript consisting of the drawing image having the unevenness in the ground (pasted image (1)) and the photographic image (pasted image (2)). When the manuscript is decided as the pasted manuscript by the pasted-manuscript deciding portion 4, there is the case where the ground removal should be applied to the drawing image portion but the ground removal should not be applied to the photographic image portion.

More particularly, there is the possibility that the pasted-manuscript deciding portion 4 decides the portion, that has much change in the neighboring pixels or arbitrary areas like the image in the photographic portion, as the pasted image, and then decides that several pasted images are present in the photographic image. Therefore, in order to decide that the photographic image portion is not the pasted image, the processes described in the following are carried out.

First, the density of the area without the image is decided. For example, as the method of deciding the density of the area without the image, there are three methods as follows.

i) set several points of end portions of the manuscript and then calculate the average value, the decision by majority, or the like since in many cases the image is not present at end portions of the overall manuscript.

ii) set several points of top portions of the manuscript and then calculate the average value based on the decision by majority.

iii) calculate the minimum value of the overall manuscript.

The density of the area not-containing the image is decided by executing the addition, the multiplication, etc. of a constant value and the value obtained based on i) to iii), or the like.

Then, the portion having the image is detected, and then a lateral width (width1) and a vertical width (height 1) of the pasted image (1) and a lateral width (width2) and a vertical width (height 2) of the pasted image (2) are calculated.

Here, a certain reference width δ is defined and then following decision is made.

> Width≧δ: the image is the ground removing object.
>
> Width<δ: the image is not the ground removing object.

Any plural pieces of the width 1, the height 1, the width2, and the height 2 are compared mutually in calculation. In this case, the decision using the diagonal line or the area of the image in addition to the width may be employed. Also, the 8 may be input by the user, or decided based on a rate of the width or area of the image to the width or area of the input manuscript.

In addition, the ground-level adjusting portion 5 decides the ground level of the image portion, that is decided as the image which is not the ground removing object, by any portion given in the following.

a) the ground level decided as the portion without the images shown in the above i) to iii).

b) the ground level around the image that is not decided as the ground removing object. For example, several points are sampled and the average value is utilized.

c) the ground level of the image that is not the ground removing object and is input previously by the user inputting portion 2 or guessed from the average value of the overall manuscript, etc.

d) the constant ground level that is previously decided.

e) the ground removal is not executed, or the ground level is set to 0.

In contrast, the above-mentioned ground level adjustment is applied to the image corresponding to the ground removing object to execute the ground removal.

According to such process, it is possible not to apply the ground removal to the image such as the photograph in the pasted manuscript, in which the ground level is not constant when it is detected, automatically or according to the user's indication. Therefore, even if the images that need the ground removal is mixed, they can be processed at the same time.

Figure 14B:
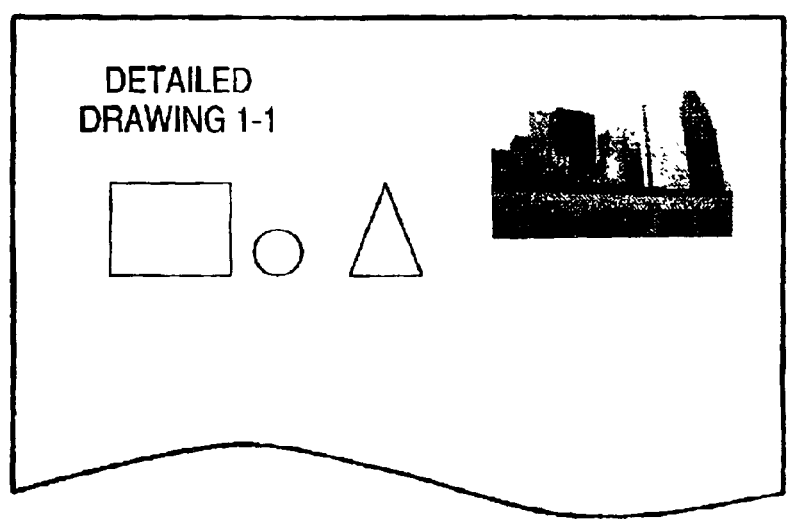

Also, since either the image whose ground level is not constant can be decided as the previously defined ground level or any place of the manuscript can be decided as the ground level, such image can be removed. Therefore, in the case of the pasted manuscript that is obtained by printing the image the ground level of which is not constant on the sheet having the ground, it is possible to remove only the natural ground of the sheet (see FIG. 14B).

Here, in the case of the pasted manuscript, sometimes the ground levels of respective pasted images are not constant and such ground levels are deep and light, as shown in FIG. 3A. In addition, since the imaged data that the image inputting portion I can receive has the upper limit value, in many cases the lower contrast is obtained, i.e., the density value of the ground level become closer to that of the to-be-left information such as the letters, the lines, etc. as the densities become deeper.

For this reason, in order not to delete the information necessary for the case where the ground level is deep, the adjustment for the case where the ground level density is deep can be carried out in addition to the ground level obtained after the previouslymentioned adjustment made by the ground-level adjusting portion 5.

Figure 3B:
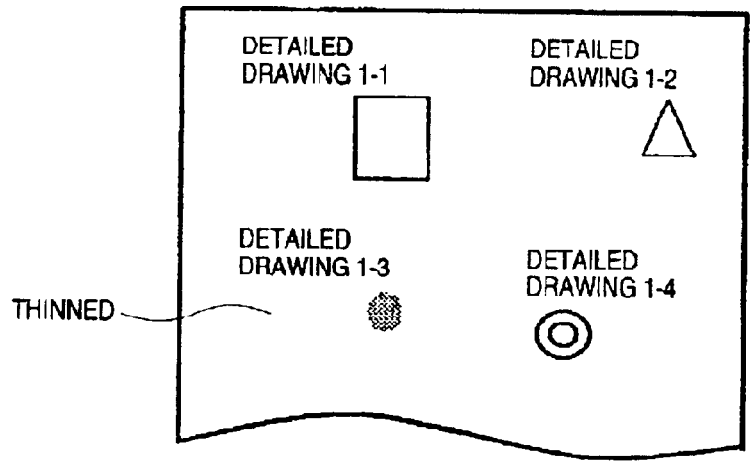
Figure 15A:
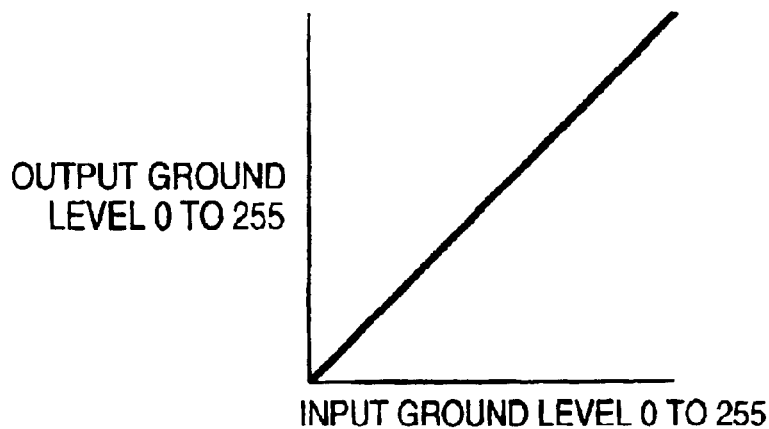
FIGS. 15A–15C are views showing low contrast adjustment.

FIG. 15A shows the output ground level in response to the input ground level when the low contrast adjustment is not carried out. In the results obtained by applying the ground removing process based on this, as shown in FIG. 3B, there is the possibility that the necessary densities such as the letters, the lines, etc. become light in the image portion having the high ground level density.

Figure 3C:
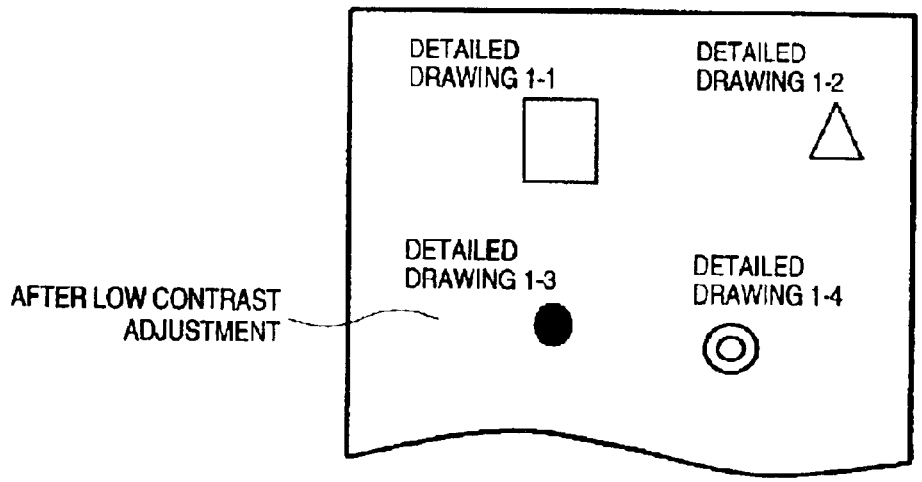
Figure 15B:
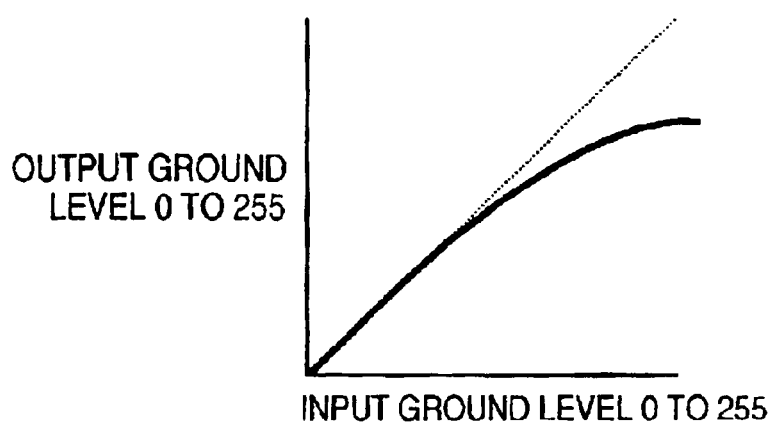
Figure 15C:
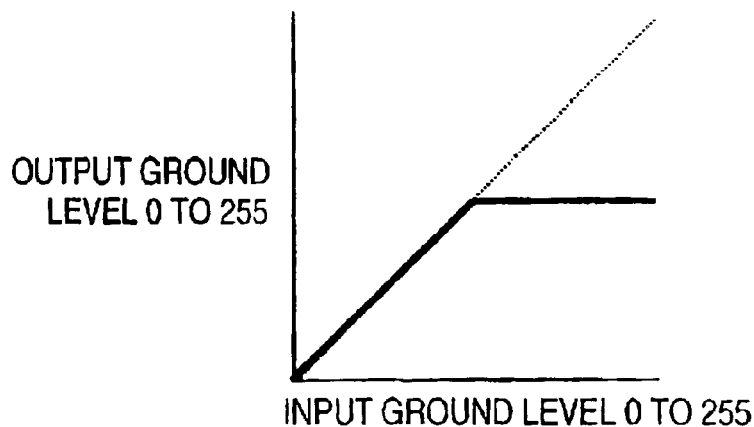

Therefore, as shown in FIG. 15B and 15C, if the output ground level is adjusted lower (lighter) as the input ground level density becomes higher (deeper), the letters, the lines, etc. do not become light even though the ground level density becomes high to produce the low contrast (see FIG. 3C). The relationship between the input/output ground levels shown in FIG. 15B and 15C is an example, and combinations of the straight line, the curved line, etc. may be applied.

According to such process, it is possible to apply uniformly the ground removing process to the overall manuscript such as the pasted manuscript in which various ground levels are mixedly present.

[Advantages of the Invention]

As described above, according to the present invention, following advantages can be achieved. In other words, the proper ground adjustment can be executed in the case of the pasted manuscript and the manuscript having the unevenness in the ground, and thus the more proper ground removing process can be applied to respective manuscripts. Also, if the ground level is changed sharply or switched at the border portions between the pasted images in the pasted manuscript, it is feasible to properly execute the ground removal around the border portions between the pasted images. In addition, if the ground level is changed continuously not to change abruptly, the unevenness of the image obtained after the ground is removed can be eliminated and thus the more natural ground removing process can be applied to the manuscript having the unevenness in the ground.

What is claimed is:

1. An image processing system comprising:
   an image inputting portion for inputting image data;
   a ground-level detecting portion for detecting a ground level of the image data input by said image inputting portion;
   a pasted-manuscript deciding portion for deciding whether or not the image data is a pasted manuscript, based on a user's indication or the ,ground level detected by said ground-level detecting portion;
   a ground-level adjusting portion for adjusting the ground level in response to a distribution of the ground level detected by said ground-level detecting portion, if the image data is decided as the pasted manuscript by said pasted-manuscript deciding portion; and
   a ground removing portion for removing a ground of the image data at the ground level adjusted by said ground-level adjusting portion.

2. The image processing system according to claim 1, further comprising:
   a user inputting portion for accepting a user's indication to identify the pasted manuscript, or an indication of automatic discrimination issued by said pasted-manuscript deciding portion.

3. The image processing system according to claim 1, wherein
   said pasted-manuscript deciding portion looks up the ground level detected by said ground-level detecting portion, then calculates areas in which a degree of change in the ground level in neighboring pixels around an attentional pixel or in an arbitrary area containing the attentional pixel is larger than a predetermined reference value, and decides based on a number of the areas whether or not the image data is the pasted manuscript.

4. The image processing system according to claim 1, wherein
   said ground-level adjusting portion adjusts the ground level to meet change in the ground level detected by said ground-level detecting portion, if it is decided by said pasted-manuscript deciding portion that the image data is the pasted manuscript.

5. The image processing system according to claim 1, wherein
   said ground-level adjusting portion adjusts the ground level to change continuously and gradually, if the ground level detected by said ground-level detecting portion is varied.

6. The image processing system according to claim 1, wherein
   said ground-level adjusting portion discriminates a border portion of a pasted image from variation in the ground level, if the pasted image and an image having the variation in the ground level are contained in the pasted manuscript.

7. The image processing system according to claim 1, wherein
   said ground-level adjusting portion decides whether or not adjustment of the ground level is executed, based on a size of a pasted image, if the image data is decided as the pasted manuscript by said pasted-manuscript deciding portion.

8. The image processing system according to claim 7, wherein
   said ground-level adjusting portion decides whether or not adjustment of the ground level is executed, based on a size of the pasted image that is set previously or a size of the pasted image that is given by the user's indication.

9. The image processing system according to claim 7, wherein
   said ground-level adjusting portion selects the ground level of the image data that is decided not to execute the adjustment of the ground level, from the ground level that is set previously, the ground level that is calculated from several peripheral pixels in the image in which ground removal is not needed, and the ground level that is calculated based on any number of any areas selected from areas in which no image is supposed.

10. The image processing system according to claim 1, wherein
    said ground-level adjusting portion adjusts to lower the ground level, if the ground level detected by said ground-level detecting portion exceeds a predetermined value.

* * * * *